US012680789B2

(12) United States Patent
Saad

(10) Patent No.: US 12,680,789 B2
(45) Date of Patent: Jul. 14, 2026

(54) BALLISTIC HEADSET COVER

(71) Applicant: Daniel F. Saad, Greer, SC (US)

(72) Inventor: Daniel F. Saad, Greer, SC (US)

( * ) Notice: Subject to any disclaimer, the term of this patent is extended or adjusted under 35 U.S.C. 154(b) by 66 days.

(21) Appl. No.: 18/364,108

(22) Filed: Aug. 2, 2023

(65) Prior Publication Data

US 2025/0044062 A1     Feb. 6, 2025

(51) Int. Cl.
 *F41H 1/00*        (2006.01)
 *B32B 3/06*        (2006.01)
 *B32B 5/02*        (2006.01)
 *B32B 5/26*        (2006.01)
 *F41H 5/04*        (2006.01)

(52) U.S. Cl.
 CPC ............. *F41H 5/0478* (2013.01); *B32B 3/06* (2013.01); *B32B 5/024* (2013.01); *B32B 5/263* (2021.05); *B32B 2250/05* (2013.01); *B32B 2250/20* (2013.01); *B32B 2262/0253* (2013.01); *B32B 2307/51* (2013.01); *B32B 2307/7376* (2023.05); *B32B 2571/02* (2013.01)

(58) Field of Classification Search
 CPC .. A41D 13/0518; A41D 27/28; A41D 13/015; A41D 31/14; A41D 13/0568; F41H 1/02; F41H 5/0492; A41B 2400/20; A41B 9/00; A41B 9/06; A41B 9/12
 USPC ...... 2/463, 113, 2.5, 92, 256, 455, 464, 468, 2/DIG. 1; 89/36.05; 411/911; 109/49.5
 See application file for complete search history.

(56) References Cited

U.S. PATENT DOCUMENTS

| | | | | |
|---|---|---|---|---|
| 3,018,210 | A | * | 1/1962 | Frieder .................. B29C 70/46 |
| | | | | 156/289 |
| 5,729,830 | A | | 3/1998 | Luhtala |
| 6,499,145 | B1 | | 12/2002 | Kates |
| 6,807,890 | B1 | * | 10/2004 | Fuqua ....................... F41H 5/08 |
| | | | | 89/36.02 |
| 7,343,843 | B2 | * | 3/2008 | Sharpe ................. B65D 90/325 |
| | | | | 89/36.02 |
| 7,348,053 | B1 | * | 3/2008 | Weedon .................. B32B 27/32 |
| | | | | 2/5 |
| 7,937,778 | B1 | | 5/2011 | Norton |
| 8,443,467 | B2 | * | 5/2013 | Chiang ................... A61F 11/06 |
| | | | | 2/209 |
| 8,613,114 | B1 | | 12/2013 | Olivares Velasco |
| 8,739,316 | B1 | | 6/2014 | Norton |
| 10,697,736 | B2 | | 6/2020 | Saad |
| 2011/0307997 | A1 | | 12/2011 | Blair |
| 2014/0007324 | A1 | | 1/2014 | Svehaug |
| 2019/0353463 | A1 | * | 11/2019 | Saad ....................... A42B 1/205 |
| 2024/0068784 | A1 | * | 2/2024 | Saad ........................ F41H 1/02 |
| 2025/0044061 | A1 | * | 2/2025 | Saad ........................ A42B 1/08 |
| 2025/0044062 | A1 | * | 2/2025 | Saad ........................ B32B 5/26 |

FOREIGN PATENT DOCUMENTS

EP          3329205 B1 *  3/2021  ........... F41H 5/0464

OTHER PUBLICATIONS

EP 3329205 B1.*

* cited by examiner

*Primary Examiner* — Michael D David
(74) *Attorney, Agent, or Firm* — Dority & Manning, P.A.

(57)          ABSTRACT

A ballistic cover includes a fabric case and a panel received within an interior of the fabric case. The panel includes a plurality of ballistic sheets mounted together to collectively form the panel. The ballistic cover may be mountable to a headset.

9 Claims, 2 Drawing Sheets

BALLISTIC HEADSET COVER

FIELD OF THE INVENTION

The present subject matter relates generally to ballistic garments, namely flexible ballistic covers for headsets, earmuffs, and other ear protection devices.

BACKGROUND OF THE INVENTION

Firearms are a known hazard to law enforcement officers. In 2016, one hundred and forty-three law enforcement officers died in the line of duty, and sixty-six of these deaths were attributed to lethal gunshot wounds. Law enforcement officers have worn ballistic vests for decades to reduce the risk of lethal gunshot wounds, but ballistic vests have limitations. In particular, ballistic vests protect torsos while leaving other body parts vulnerable to gunshot wounds.

The head is particularly vulnerable to gunshots, and known ballistic vests offer no head protection. Gunshot wounds to the head are associated with high risk of death or grave disability due to irreversible brain tissue damage. Ballistic helmets are available that can reduce head damage from gunshot wounds. However, certain helmets are shaped to allow headsets to rest near ears of the wearer. The headsets can facilitate communication but generally do not offer significant ballistic protection. Thus, known helmets frequently do not cover all vulnerable portions of the head, including ears to allow for headset communication.

BRIEF DESCRIPTION OF THE INVENTION

Aspects and advantages of the invention will be set forth in part in the following description, or may be apparent from the description, or may be learned through practice of the invention.

In general, the present subject matter provides a ballistic cover for a headset, earmuffs, or other ear protection devices. The cover includes a plurality of flexible ballistic sheets mounted together to collectively form a ballistic panel in the cover. The ballistic panel may protect the wearer from injuries and may be resistant to penetration by projectiles, such as bullets. The cover may be mounted over a headset. Thus, the ballistic panel may cover vulnerable portions of the head below the headset, which generally does not offer significant ballistic protection. Moreover, the cover may supplement ballistic protection of a helmet. For instance, the helmet may protect large portions of the head but may also be shaped to allow the headset to rest near the ears of the wearer to allow for communication via the headset. The cover may thus protect areas of the head not covered by the helmet.

In an example embodiment, a ballistic headset cover includes a fabric case mountable on a headset and a panel received within an interior of the fabric case. The panel includes a plurality of ballistic sheets mounted together to collectively form the panel.

In a first example aspect, the fabric case includes an elastic portion defining an opening. The headset is receivable into an interior of the elastic portion through the opening. A panel support portion is mounted to the elastic portion opposite the opening. The panel is received within the panel support portion.

In a second example aspect, the elastic portion defines a width along a lateral direction. The panel defines a width along the lateral direction. The elastic portion is deformable from a normal configuration. The width of the elastic portion in the normal configuration is less than the width of the panel.

In a third example aspect, the panel is elliptically-shaped or rectangularly-shaped.

In a fourth example aspect, the panel is removable from the interior of the fabric case.

In a fifth example aspect, a thickness of the panel formed by the plurality of flexible ballistic sheets is no less than four millimeters and no greater than eight millimeters.

In a sixth example aspect, the plurality of flexible ballistic sheets comprises no less than fifteen flexible ballistic sheets.

In a seventh example aspect, each of the plurality of flexible ballistic sheets comprises ultra-high-molecular-weight polyethylene fibers.

In an eighth example aspect, the panel conforms to the NIJ Type IIIa standard.

In a ninth example aspect, the plurality of flexible ballistic sheets are mounted together by adhesive or thermal bonding.

Each of the example aspects recited above may be combined with one or more of the other example aspects recited above in certain embodiments. For instance, all of the nine example aspects recited above, i.e., the first through ninth examples aspects, may be combined with one another in some embodiments. As another example, any combination of two, three, four, five, or more of the nine example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

In another example embodiment, a ballistic cover includes a fabric case and a panel received within an interior of the fabric case. The panel includes a plurality of ballistic sheets mounted together to collectively form the panel. The panel has a first width along a first lateral direction and a second width along a second lateral direction that is perpendicular to the first lateral direction. The first width of the panel is no greater than twelve centimeters. The second width of the panel is no greater than ten centimeters. A thickness of the panel is no less than four millimeters and no greater than eight millimeters.

In a tenth example aspect, the fabric case includes an elastic portion defining an opening. The headset is receivable into an interior of the elastic portion through the opening. A panel support portion is mounted to the elastic portion opposite the opening. The panel is received within the panel support portion.

In an eleventh example aspect, the elastic portion defines a width along a lateral direction. The panel defines a width along the lateral direction. The elastic portion is deformable from a normal configuration. The width of the elastic portion in the normal configuration is less than the width of the panel.

In a twelfth example aspect, the panel is elliptically-shaped or rectangularly-shaped.

In a thirteenth example embodiment, the panel is removable from the interior of the fabric case.

In a fourteenth example embodiment, the plurality of flexible ballistic sheets comprises no less than fifteen flexible ballistic sheets.

In a fifteenth example aspect, each of the plurality of flexible ballistic sheets comprises ultra-high-molecular-weight polyethylene fibers.

In a sixteenth example aspect, the panel conforms to the NIJ Type IIIa standard.

In a seventeenth example aspect, the plurality of flexible ballistic sheets are mounted together by adhesive or thermal bonding.

Each of the example aspects recited above may be combined with one or more of the other example aspects recited above in certain embodiments. For instance, all of the eight example aspects recited above, i.e., the tenth through seventeenth examples aspects, may be combined with one another in some embodiments. As another example, any combination of two, three, or four of the eight example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
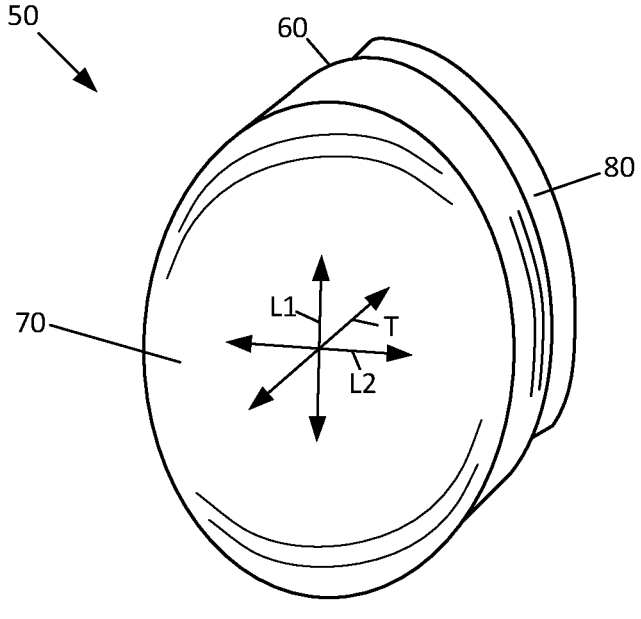
FIG. 1 is a perspective view of a ballistic cover according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

When introducing elements of the present disclosure or the preferred embodiment(s) thereof, the articles "a", "an", "the" and "said" are intended to mean that there are one or more of the elements. As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 is perspective view of a ballistic cover 50 according to an example embodiment of the present subject matter. As discussed in greater detail below, ballistic cover 50 may be mounted on a communications headset, earmuffs, or other ear protection devices to protect the skull and brain of a wearer. For example, the ballistic cover 50 may limit or prevent projectiles from penetrating the skull so that underlying brain tissue is thereby protected. Thus, e.g., the ballistic cover 50 may be positioned on devices, which offer only limited ballistic protection, in order to protect the wearer while also allowing the wearer to utilize the devices.

Figure 2:
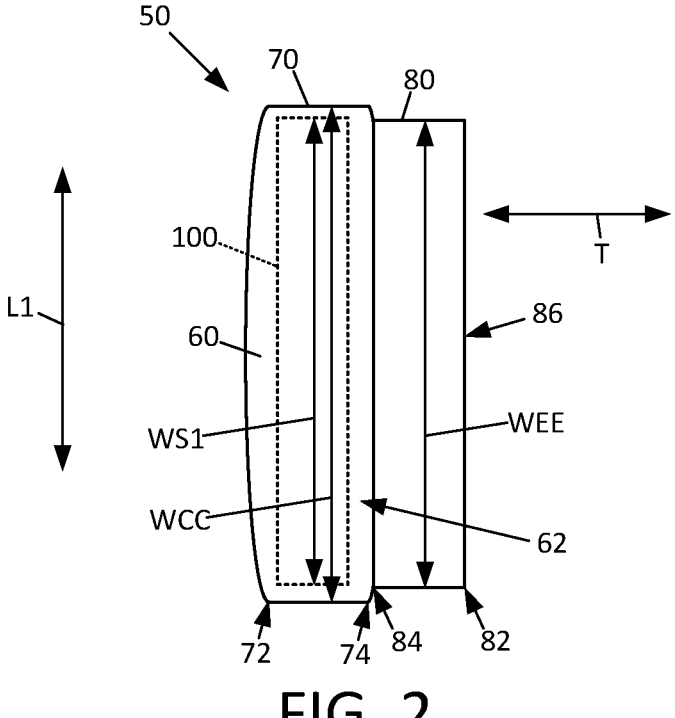
FIG. 2 is a side, elevation view of the example ballistic cover of FIG. 1.

As shown in FIGS. 1 and 2, ballistic cover 50 includes a fabric case 60 and a panel 100. The fabric case 60 may be mountable on a headset, such as a headset 20 (FIG. 3), earmuffs, or other ear protection devices. The panel 100 may be received within an interior 62 of the fabric case 60. Thus, the fabric case 60 may be hollow and sized for receipt of panel 100 within the interior 62 of the fabric case 60. The fabric case 60 may formed of or with any suitable natural or synthetic fibers, such as cotton, nylon, etc.

As shown in FIG. 2, the fabric case 60 may include a panel support portion 70 and an elastic portion 80. The panel support portion 70 may be configured for receipt and support of the panel 100, and the elastic portion 80 may be configured for assisting with mounting of the ballistic cover 50 on a headset, earmuffs, or other ear protection devices. The elastic portion 80 may include elastic strands that stretch and contract. For example, the elastic portion 80 may have a width WEE, e.g., along a first lateral direction L1, and the elastic portion 80 may elastically deform such that the width WEE of the elastic portion 80 is increased when the elastic portion 80 is deformed from a normal condition, such as the condition shown in FIG. 2. The elastic portion 80 may be deformed to allow a headset, earmuffs, or other ear protection device to be inserted into interior 62 of the fabric case 60, e.g., through an opening 86 at a first end portion 82 of the elastic portion 80. Moreover, the elastic portion 80 may contract against or around the headset, earmuffs, or other ear protection device to assist with holding the ballistic cover 50 thereon.

The panel support portion 70 may be mounted to the elastic portion 80 opposite the opening 86. For instance, elastic portion 80 may extend between the first end portion 82 and a second end portion 84, e.g., along a transverse direction T. The panel support portion 70 may be mounted to the elastic portion 80 at the second end portion 84 of the elastic portion. Moreover, the panel support portion 70 may extend between a first end portion 82 and a second end portion 84, e.g., along the transverse direction T. The first end portion 72 of the panel support portion 70 may be positioned at and mounted to the second end portion 84 of the elastic portion 80. The panel support portion 70 may not include elastic strands in some example embodiments.

The panel support portion 70 may have a width WCC, e.g., along the first lateral direction L1. The width WCC of the panel support portion 70 may be greater than the width WEE of the elastic portion 80 in the normal condition, e.g., to limit or prevent panel 100 from exiting the panel support portion 70 into the elastic portion 80. Thus, such relative sizing of the panel support portion 70 and elastic portion 80 may assist with holding the panel 100 within the fabric case 60. The width WCC of the panel support portion 70 may also be greater than a first width WS1 of the panel 100, e.g., along the first lateral direction L1, to allow receipt of the panel 100 in the panel support portion 70.

The panel 100 may be received within the panel support portion 70. For example, the panel 100 may be inserted through the opening 86 and then into the panel support portion 70. Thus, the interior 62 of the fabric case 60 may extend along the transverse direction T from the first end portion 82 of the elastic portion 80 to the second end portion 74 of the panel support portion 70. In example embodiments, the fabric case 60 may be open at the first end portion 82 of the elastic portion 80 to allow receipt and removal of panel 100, and the fabric case 60 may be closed at the second end portion 74 of the panel support portion 70 to assist with holding panel 100 within fabric case 60.

The panel 100 may be shaped in a manner complementary to an underlying headset, earmuff, or other ear protection device within the ballistic cover 50. For example, the panel 100 may be elliptically-shaped or rectangularly-shaped. The first width WS1 of the panel 100 may be no greater than twelve centimeters (12 cm), such as no greater than ten centimeters (10 cm), such as no greater than eight centimeters (8 cm), such as no greater than six centimeters (6 cm). The panel 100 may also have a second width WS2 along a second lateral direction L2 that is mutually perpendicular to the first lateral direction L1 and the transverse direction T. Thus, the second width WS2 of the panel 100 is oriented into and out of the page in FIG. 2. The second width WS2 of the panel 100 may be no greater than ten centimeters (10 cm), such as no greater than eight centimeters (8 cm), such as no greater than six centimeters (6 cm). In example embodiment, the first width WS1 of the panel 100 may be greater than the second width WS2 of the panel 100. Thus, the first width WS1 of the panel 100 may correspond to a major axis of the panel 100, and the second width WS2 of the panel 100 may correspond to a minor axis of the panel 100.

The panel 100 may be formed from layers of a fiber material that is resistant to penetration by projectiles, such as bullets. As an example, the panel 100 may be constructed of or with layers of fabric having one or more of ultra-high-molecular-weight polyethylene fibers and para-aramid fibers. In certain example embodiments, the ultra-high-molecular-weight polyethylene fibers may be Dyneema® or Spectra® brand fibers, and the para-aramid fibers may be Kevlar® brand fibers. The ultra-high-molecular-weight polyethylene fibers and para-aramid fibers may be woven together to form the sheets of ballistic fibers, which may be layered to form the panel 100. The fiber material within panel 100 may be flexible and/or lighter than hard armor panels. Thus, the panel 100 may be more comfortable for extended wear relative to hard armor panels. The ballistic sheets 110 may be flexible in example embodiments.

Figure 4:
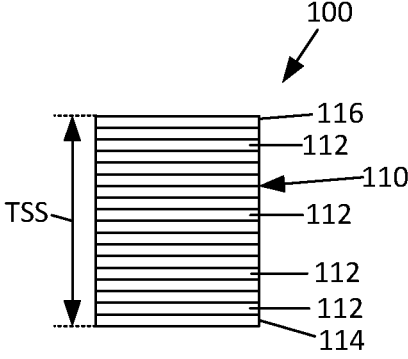
FIG. 4 is a section view of a ballistic panel of the example ballistic cover of FIG. 1.

As shown in FIG. 4, a plurality of ballistic sheets 110 may be stacked together and mounted to one another to collectively form the panel 100. The ballistic sheets 110 may include a suitable number of ballistic sheets 110. In example embodiments, the ballistic sheets 110 may include no less than ten (10) ballistic sheets 10, such as no less than twelve (12) ballistic sheets 10, such as no less than fifteen (15) ballistic sheets 10, such as no less than seventeen (17) ballistic sheets 10, such as no less than twenty (20) ballistic sheets 10. In example embodiments, the ballistic sheets 110 may include no greater than thirty (30) ballistic sheets 10, such as no greater than twenty-five (25) ballistic sheets 10, such as no greater than twenty-two (22) ballistic sheets 10, such as no greater than twenty (20) ballistic sheets 10. Such number of ballistic sheets 110 within the panel 100 may advantageously assist with limiting or preventing penetration of panel 100 by projectiles, such as bullets, while also providing comfortable protection during extended wear of ballistic cover 50, e.g., over a headset, earmuffs, or other ear protection devices.

The panel 100 may have a thickness TSS between opposite side ballistic sheets 110, e.g., between an outer ballistic sheet 114 at an outer side of panel 100 and an inner ballistic sheet 116 at an inner side of panel 100. The inner side of the panel 100 may face towards a wearer of ballistic cover 50 when worn, and the outer side of the panel 100 may face away from the wearer of panel 100 when the ballistic cover 50 is on the wearer. The thickness TSS of panel 100 may be no less than two millimeters (2 mm) and no greater than twenty millimeters (20 mm), such as no less than three millimeters (3 mm) and no greater than fifteen millimeters (15 mm), such as no less than four millimeters (4 mm) and no greater than eight millimeters (8 mm). Such sizing of the TSS of the panel 100 may advantageously provide comfortable protection during extended wear of cover 50, e.g., on a communications headset.

The ballistic sheets 110 may be mounted together in a suitable manner to form the panel 100. For instance, ballistic sheets 110 may be mounted together by adhesive or thermal bonding, such as by heating ballistic sheets 110 such that adjacent ballistic sheets 110 melt together. It will be understood that ballistic sheets 110 may include a film over the woven ultra-high-molecular-weight polyethylene fibers and/or para-aramid fibers that may be melted together to heat bond the adjacent ballistic sheets 110.

The ballistic cover 50 may be configured to protect against assaults with handguns and may also be suitable for extended daily wear. Thus, the ballistic cover 50 may be worn by members of the armed forces, law enforcement officers, etc. while executing their duties. Moreover, the ballistic cover 50 may be positioned over a communications headset, earmuffs, or other ear protection devices.

Figure 3:
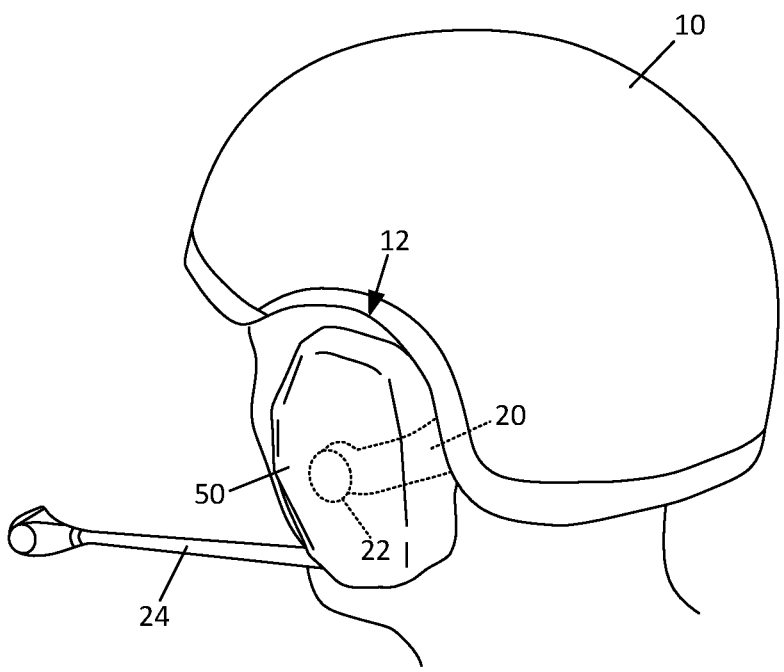
FIG. 3 is a perspective view of the example ballistic cover of FIG. 1 on a headset and a helmet.

As shown in FIG. 3, a wearer may wear a helmet 10 that provides significant head protection for the wearer. However, the helmet 10 may include ear openings or slots 12 without armor for ballistic protection. The slots 12 may be sized and shaped for receipt of at least a portion of a communications headset 20. The headset 20 may include a speaker 22 and a microphone 24. Thus, the wearer of the helmet 10 may hear audio via the speaker 22, and the microphone 24 may pick up speech of the wearer while the helmet 10 is on the wearer.

The slots 12 may advantageously allow for the wearer to use the headset 20 while wearing the helmet 10. However, the slots 12 lack ballistic armor, and the headset 20 does not provide significant ballistic protection. By mounting the ballistic cover 50 on the headset 20, e.g., on the speaker 22 of the headset 20, the ballistic cover 50 may be positioned to limit or prevent projectiles from penetrating the skull so that underlying brain tissue is thereby protected. Moreover, the ballistic cover 50 may provide ballistic protection for the wearer of helmet 10 despite the presence of slots 12 and/or headset 20. For instance, the ballistic cover 50 may supplement the protection provided by helmet 10 while allowing for use of the headset 20.

Panel 100 may include multiple layers of strong, ballistic-resistant flexible sheets 110 that engage and deform a projectile in order to spreading a force of the projectile over a larger portion of panel 100, relative to an undeformed projectile. Panel 00 can absorb energy from the deforming projectile and stop the projectile before the projectile completely penetrates the cover 50. In certain example embodiments, the panel 100 may conform to the NIJ Type IIIa standard and thus protect against penetration by the bullets described in such standard. Thus, e.g., panel 100 may stop .357 SIG and .44 Magnum ammunition fired from longer barrel handguns.

The panel 100 may be removable from the cover 50. Thus, e.g., the panel 100 may be removed from the fabric case 60 to allow cleaning of fabric case 60, replacement of fabric case 60, etc. In alternative example embodiments, the panel 100 may be attached to (e.g., sewn, adhered, riveted, etc.) the fabric case 60 such that the panel 100 is not removable from the fabric case 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ballistic cover, comprising:
a fabric case sized such that the fabric case is mountable on a headset; and
a panel received within an interior of the fabric case such that the panel covers the headset when the fabric case is mounted on the headset, the panel comprising a plurality of ballistic sheets mounted together to collectively form the panel, the panel has a first width along a first lateral direction and a second width along a second lateral direction that is perpendicular to the first lateral direction, the first width of the panel being no greater than twelve centimeters, the second width of the panel being no greater than ten centimeters, and a thickness of the panel being no less than four millimeters and no greater than eight millimeters.

2. The ballistic cover of claim 1, wherein the fabric case comprises:
an elastic portion defining an opening, the panel receivable into an interior of the elastic portion through the opening; and
a panel support portion mounted to the elastic portion opposite the opening, the panel received within the panel support portion.

3. The ballistic cover of claim 2, wherein:
the elastic portion defines a width along a lateral direction;
the panel defines a width along the lateral direction;
the elastic portion is deformable from a normal configuration; and
the width of the elastic portion in the normal configuration is less than the width of the panel.

4. The ballistic cover of claim 1, wherein the panel is elliptically-shaped or rectangularly-shaped.

5. The ballistic cover of claim 1, wherein the panel is removable from the interior of the fabric case.

6. The ballistic cover of claim 1, wherein the plurality of flexible ballistic sheets comprises no less than fifteen flexible ballistic sheets.

7. The ballistic cover of claim 1, wherein each of the plurality of flexible ballistic sheets comprises ultra-high-molecular-weight polyethylene fibers.

8. The ballistic cover of claim 1, wherein the panel conforms to the NIJ Type IIIa standard.

9. The ballistic cover of claim 1, wherein the plurality of flexible ballistic sheets are mounted together by adhesive or thermal bonding.

* * * * *